United States Patent [19]

Wong et al.

[11] Patent Number: 5,073,208

[45] Date of Patent: Dec. 17, 1991

[54] METHOD FOR CRYOGENIC TREATMENT OF CORIOLIS MASS FLOW METER STRUCTURES

[75] Inventors: Richard B. Wong, Phoenix; Wayne Pratt, Scottsdale, both of Ariz.

[73] Assignee: K-Flow Corporation, Millville, N.J.

[21] Appl. No.: 407,390

[22] Filed: Sep. 14, 1989

[51] Int. Cl.$^5$ .......................... C21D 8/10; G01F 1/84
[52] U.S. Cl. .......................... 148/11.5 R; 148/11.5 A; 148/11.5 N; 148/12 E; 148/125; 148/127; 73/861.38
[58] Field of Search .......... 148/11.5 A, 12 E, 11.5 N, 148/125, 127; 73/861.38

[56] References Cited

U.S. PATENT DOCUMENTS

| | | | |
|---|---|---|---|
| 2,903,386 | 9/1959 | Waxweiler | 148/125 |
| 4,030,314 | 6/1977 | Strehler et al. | 62/65 |
| 4,328,676 | 5/1982 | Reed | 62/3 |
| 4,455,842 | 6/1984 | Granlund | 62/64 |
| 4,491,025 | 1/1985 | Smith et al. | 73/861.38 |
| 4,711,132 | 12/1987 | Dahlin | 73/861.38 |
| 4,716,771 | 1/1988 | Kane | 73/861.38 |
| 4,726,508 | 2/1988 | Carpenter | 228/263.13 |
| 4,733,569 | 3/1988 | Kelsey et al. | 73/861.38 |
| 4,739,622 | 4/1988 | Smith | 62/78 |
| 4,756,198 | 7/1988 | Levien | 73/861.38 |
| 4,781,069 | 11/1988 | Mitzner | 73/861.38 |
| 4,823,592 | 4/1989 | Hahn | 73/3 |
| 4,845,989 | 7/1989 | Titlow et al. | 73/597 |

FOREIGN PATENT DOCUMENTS 898069  6/1962 United Kingdom ................ 148/125

OTHER PUBLICATIONS

Jo W. Johnson, "Applicability of Cryogenic Treatments Advanced with Computerized Processing", *Industrial Heating* magazine, Jul. 1988, pp. 18–20.
Charles Wick, "Stronger and Lighter Stainless Springs", Sep. 1989.
Dr. H. E. Trucks, Consulting Engineer, "How to Relieve Stresses in Extrusions, Forgings and Castings Produced from Aluminum Alloys", *Light Metal Age* magazine, Oct. 1988, pp. 5–6.

*Primary Examiner*—R. Dean
*Assistant Examiner*—Margery S. Phipps
*Attorney, Agent, or Firm*—Seidel, Gonda, Lavorgna & Monaco

[57] ABSTRACT

A method for increasing stability of a Coriolis mass flow meter by relieving residual and internal stress within the flow tube and related structures of the meter. The method including the steps of bending the flow tube in the desired form, fixing related flow tube structures onto the flow tube, clamping the flow tube so as to maintain the desired form during subsequent processes, annealing the flow tube, and cryogenically cooling the flow tube. An apparatus to be utilized along with the method of the present invention fixes the flow tube during the annealing and cryogenic cooling treatment processes to maintain the desired shape of the flow tube. The invention also contemplates the flow tube made in accordance with the method of the present invention.

18 Claims, 2 Drawing Sheets

METHOD FOR CRYOGENIC TREATMENT OF CORIOLIS MASS FLOW METER STRUCTURES

FIELD OF THE INVENTION

The present invention relates to a method for improving the stability and accuracy of Coriolis-type mass flow meters. Particularly, the invention relates to a method for the treatment of the flow tube and related structures of a Coriolis type mass flow meter by the combination of an annealing process and a cryogenic cooling process.

BACKGROUND OF THE INVENTION

Coriolis-type mass flow meters operate on the principal that a fluent material passing through a flow tube, when exposed to a deflection or oscillation transverse to the direction of flow through the tubing, will react with a measurable force (the Coriolis force) on the walls of the tubing. The Coriolis reaction is generated by the fluent material moving at an instantaneously changing curvalinear path. The Coriolis reaction acts with a force directly proportional to the mass of the material in the tubing.

Sipin Pat. No. 3,355,944 discloses that a flow tube including a distortion or deflection of the flow from a straight path will substantially increase the measurability of the Coriolis reaction. Commonly assigned, co-pending U.S. application Ser. No. 912,893, filed Sept. 26, 1986 discloses a stable flow tube structure having a centralized center of gravity which is less susceptible to sensor signal contamination due to external noise or other vibrational influences. Further, the signal to noise ratio of the flow meter is increased by oscillating the flow tube at a resonant frequency which is higher than its fundamental resonance. Commonly assigned application U.S. Ser. No. 249,805, filed Sept. 27, 1988, and its continuation-in-part U.S. application Ser. No. 404,919, Filed Sept. 8, 1989, disclose that the tuning of the vibrational wave pattern, induced along the flow tube length by the oscillation of the driver, to the resonance of the Coriolis reaction will significantly increase the measurability of the Coriolis reaction and, thus, increase the ability of the flow meter to accurately determine the mass flow.

Many of the commercial Coriolis mass flow meters that are available include a curved flow tube. The curvature imparted to the tubing is the result plastic deformation, i.e. bending, of the flow tube by, typically, cold working processes. These type processes for flow tube formation create residual internal stress within the tubing material. Further, localized residual stress is created within the tubing and related flow meter elements by welding, brazing or otherwise fixing these elements onto the flow tube during assembly of the flow meter.

During normal operation, flow tubes within a Coriolis mass flow meter, whether or not having a curvature, are continuously vibrationally or rotationally oscillated at a relatively high rate of speed for extended periods of time. The non-uniformity of the flow tube meter structural elements may cause significant errors within the mass flow determination. Further, the normal operation of the flow meter may cause the flow meter structure to relax or fail due to the presence of the residual stress within the flow tube material. Variations over time in the characteristics of the flow tube and related elements may significantly effect the accuracy of the Coriolis reaction measurement and, thus, the mass flow determination.

SUMMARY OF THE INVENTION

The present invention relates to a method and apparatus for treatment of Coriolis mass flow meter structures to relieve residual internal stress within those structures and to stabilize the operation of the flow meter over its useful life.

The method of the present invention contemplates forming the flow tube in the desired shape for use within the Coriolis mass flow meter. This formation may include the bending of the flow tube or other cold working processes. The flow tube is annealed to relieve internal and residual stress created by the forming process(es). The flow tube is then cryogenically cooled for an extended period to stabilize the material of the flow tube.

The method of the present invention may also include the attachment of fixed elements onto the flow tube. These related flow meter structures, such as sensors, clamping pins or the like, may be attached to the flow tube in any convenient matter, such as by welding, brazing or the like prior to the cryogenic cooling step.

The apparatus of the present invention includes a flow tube bending form for maintaining the form of the flow tube during both the annealing and cryogenic cooling steps.

The present invention further contemplates a Coriolis mass flow meter including a flow tube and related structures which have been formed in accordance with the method contemplated by the present invention.

BRIEF DESCRIPTION OF THE DRAWINGS

For the purpose of illustrating the present invention, there is shown in the drawings a form which is presently preferred; it being understood, however, that this invention is not limited to the precise arrangements and instrumentalities shown.

DETAILED DESCRIPTION OF THE INVENTION

The present invention relates to a method for treatment of Coriolis mass flow meter structures. In the figures, where like numerals illustrate like elements, there is shown a form of the apparatus in accordance with the present invention. This apparatus generally includes a flow tube bending form 10 and a clamping block 12 which serves to fix a flow tube 14 during the method contemplated by the present invention.

Figure 1:
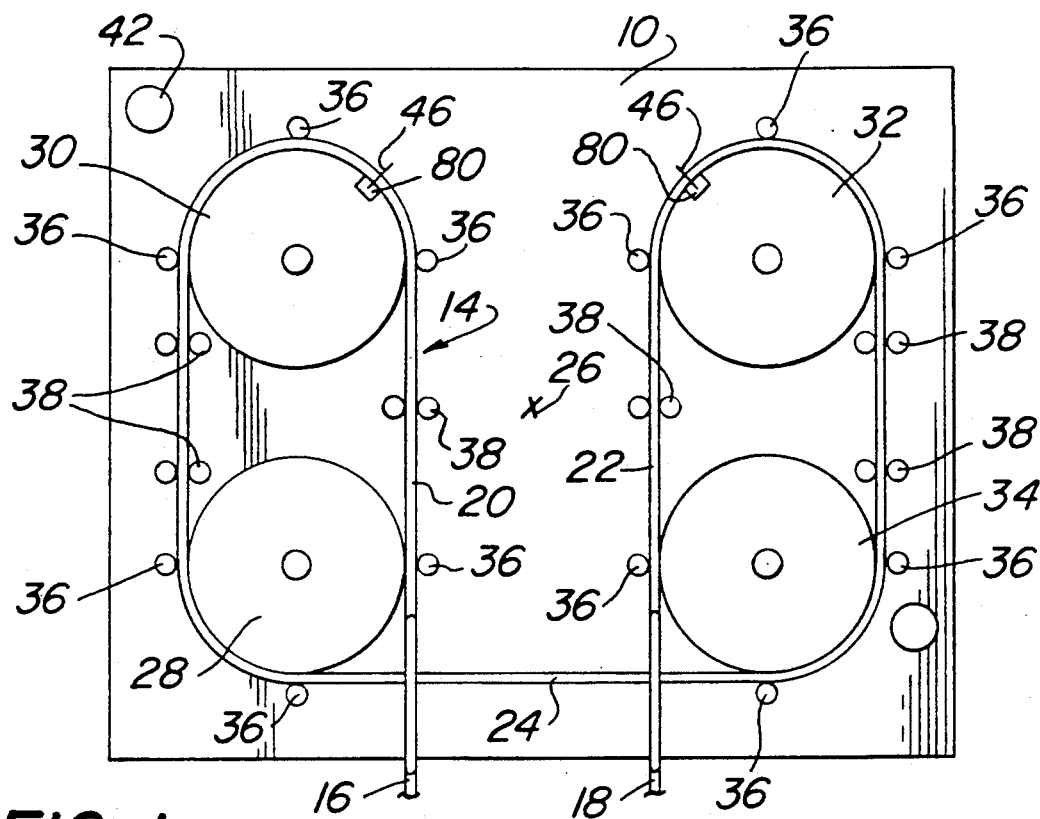
FIG. 1 shows a top plan view of an apparatus in accordance with the present invention.
Figure 2:
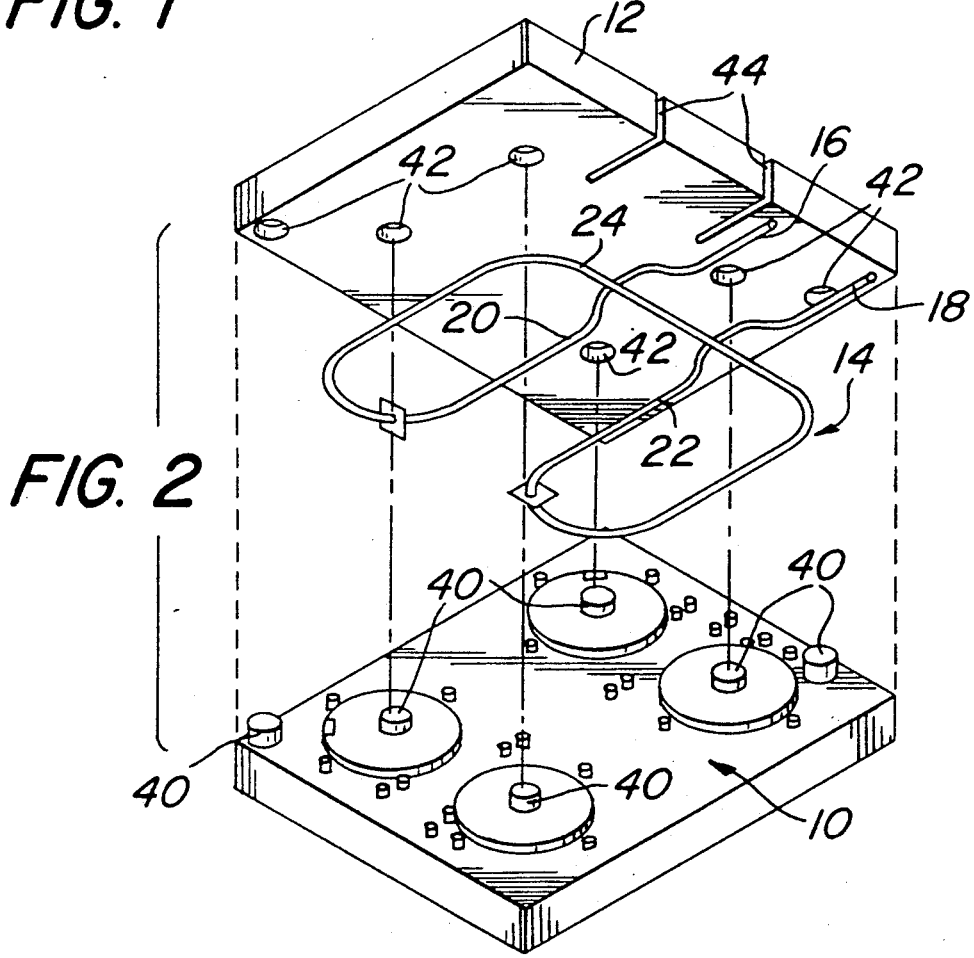
FIG. 2 shows an exploded view of the apparatus shown in FIG. 1.

The flow tube 14, as illustrated in FIGS. 1 and 2, is formed generally in accordance with the teachings of commonly assigned, co-pending U.S. application Serial No. 912,893, filed Sept. 26, 1986, and particularly in accordance with U.S. application Serial No. 404,919, filed Sept. 8, 1989, and its parent U.S. application Ser. No. 249,805, filed Sept. 27, 1988. These commonly assigned applications are herein incorporated by reference. The flow tube 14 generally includes an inlet end 16 and an outlet end 18, mounting segments 20, 22 and a sensing portion 24. The sensing portion 24 within a Coriolis mass flow meter is generally defined as the unsupported flow tube length positioned between fixed ends when assembled within the flow meter. The sensing portion 24 of the flow tube 14 as formed in the manner shown surrounds its center of gravity 26. The mounting segments 20, 22 are those portions of the flow tube 14 which fix the position of the tubing in the flow meter mounting structure (not shown). The mounting segments 20, 22 generally extend between the sensing portion 24 and the inlet end 16 and outlet end 18, respectively. Adjacent the mounting segments 20, 22 is a curvature in the tubing which may be provided as a stress relief for forces acting along the flow line communicating with the flow tube 14.

The bending form 10 shown in FIGS. 1 and 2 includes a series of turn blocks 28, 30, 32 and 34. A series of alignment pins 36 are positioned proximal to the turn blocks 28-34. A series of dual alignment pins 38 are positioned between adjacent turn blocks 28 and 30, 32 and 34. The space between alignment pins 36 and their associated turn blocks 28-34, as well as the space between dual alignment pins 38, substantially conforms to the outside diameter of the flow tube 14. The pattern of the pins and blocks generally define a discontinuous channel for placement of the flow tube 14. A series of projections 40 are provided on the bending form 10. These projections engage within corresponding key holes 42 in clamping block 12. Slots 44 in clamping block 12 receive the stress relief bends in the flow tube 14 between the mounting portions 20, 22 and the inlet and outlet ends 16, 18, respectively.

The flow tube 14 is bent into the desired form prior to the flow meter assembly. It is contemplated that the bending of the flow tube will be a cold working or similar process, as generally known in the art. This bending of the flow tube 14 creates internal residual stress within the tubing material. In order to relieve this residual stress, an annealing process is applied to the flow tube 14. This annealing process includes heating the flow tube 14, such as in a vacuum furnace, to a temperature in the range of 2100° F. for approximately ten minutes.

The fixing of the flow tube 14 between the bending form 10 and clamp block 12 is to maintain the shape of the flow tube 14 during the annealing and subsequent treatment processes. The formed flow tube 14 is placed within the space between pins 36 and blocks 28-34 and the space between dual pins 38. Upon positioning the flow tube 14 on bending form 10, clamping block 12 is attached to the bending form 10 over the flow tube 14. Thus, upon assembly, the bending form 10 and clamping block 12 generally form a sandwich with the flow tube 14 being positioned therebetween. The channel defined by the blocks 28-34, pins 36, and dual pins 38 prevent the flow tube from relaxing when the temperature of the tubing is elevated during the annealing process.

The working of the flow tube 14 into its desired form generally changes the structure of its material. The bent tubing includes long and short crystalline structures. The annealing process relieves the residual stress created within the flow tube 14 by recrystallizing the tubing material. For example, if the flow tube is made of stainless steel, the annealing will cause the carbon to return into the alloy solution.

It has been found that upon annealing the flow tube, further stress relief can be achieved by performing a deep cryogenic cooling process on the flow tube and related elements. The cryogenic cooling process may be performed in any number of methods. One method is described by Smith, U.S. Pat. No. 4,739,622, which is herein incorporated by reference.

The cryogenic cooling process described in Smith reduces the temperature in stages to approximately −320° F. Initial cooling of the flow tube is performed by evaporating vapors from a cryogenic liquid pool. Thereafter, the cooling is performed by partial or substantial submersion or soaking of the flow tube 14, along with the bending form 10 and the clamping block 12, in the cryogenic liquid. After the soaking period, the temperature within the cooling chamber is raised to ambient temperature by a controlled evaporation of the cryogenic liquid. The cryogenic cooling process generally takes a period in excess of 24 hours. The length of the process is typically dependent upon the mass of the load within the cooling chamber. Upon emergence from the cooling chamber at ambient temperature, the flow tube 14 is removed from form 10 and block 12 and then placed into the flow meter assembly.

The annealing process results in a recrystallization of the material. However, the annealed flow tube 14 includes portions where the crystalline structure remains non-homogenious. Such irregularities within the tubing may detrimentally effect the operation of the flow meter. The cryogenic cooling process further relieves residual stress by providing a more homogeneous crystalline structure. It is believed that the cryogenic cooling realigns the molecular structure within the tubing which has distorted during the various working processes and which has not been fully recrystallized by the annealing process. Generally, for stainless steel tubing the structure of the material resulting from the cryogenic cooling process includes more of the carbon in solution and, thus, becomes more martensitic. The cooling process removes the austenite within the material and provides slightly smaller grains therein.

The effect of the realignment and recrystallization caused by the cryogenic cooling process is an increase in the density of the material, likely by a reduction of the space between the grains. Further, the spring constant of the tubing is slightly higher since the material is relatively stiffer. This is generally opposite of the annealing process which softens the material to reduce residual stress.

The method of the present invention generally provides the advantage of preventing failure of the tubing material due to peak stress locations. Peak stress is the sum of the residual and operating stresses within the tubing. Further, the reduction of residual stress within the flow tube prevents the tubing from relaxing during extended operation. Moreover, the reformation of the tubing material stabilizes the spring constant of the flow tube over the useful life. Since flow tubes within Coriolis mass flow meters are oscillated at a relatively high rate of speed for extended periods of time, this stability provides an accuracy factor within the flow meter operation.

The following chart represents the stability and calibration of a flow meter including a stainless steel (316L) flow tube having an 0.062 inch outside diameter and an 0.008 inch wall thickness. The stability and calibration for the flow tube has been determined as a function of the treatment processes performed.

| Process | Calibration Factor | Stability (lbs/min) |
| --- | --- | --- |
| Bending only | 65 | .001 to .005 |
| Bending and Annealing | 15 | .0002 to .0007 |
| Bending, Annealing and Cryogenic cooling | 22 | .0001 to .0003 |

The calibration factor may be determined by measuring the signal produced from a flow meter with respect to a known flow rate. The calibration factor is a constant which may be multiplied by the measured phase difference of the meter to produce a mass flow reading.

$$M = C_f \times \phi$$

(M=mass flow; $C_f$=calibration factor; and $\phi$=net phase shift).

The stability of a calibrated flow tube is determined by operating the flow meter for a period of time without flow moving therethrough. The output of the meter is logged over the period. Even though there is no flow moving through the meter, all meters typically do not produce a zero flow result due to instability of the tubing structure and other portions of the flow meter, and due to the effects of outside noise on the flow meter. The resulting mass flow signal produced during this testing is a measure of the accuracy of the flow meter in determining the mass flow rate.

As can be seen by this chart, the annealed and cryogenically cooled flow tube has a higher calibration factor over that which is only annealed. This is likely due to the increase in the spring constant of the tubing. The annealed and cryogenically cooled flow tube has a substantially greater stability than that generally achieved by the untreated flow tube or tubing that has been processed only by annealing. For a flow meter that has a high range of instability, a high value for the stability factor, each mass flow determination becomes less exact. Thus, if the mass flow rate is 1 lb/min with a stability factor of 0.0002 lb/min, the ultimate mass flow rate determination is much more accurate than one that includes a variation in the mass flow determination at a rate of 0.001 lb/min.

The stability of the flow meter which has been annealed and cryogenically cooled is contemplated to continue over its operational life. This is due to the fact that the flow tube and its attached elements will not relax over time during normal operation. Further, after the flow meter has been operated in the field, recalibration may be performed by repeating the calibration procedure, described above, with the flow meter providing a substantially constant calibration factor.

Residual stress is also created within the flow tube by the assembly process and can be removed by the method contemplated by the present invention. For example, typically, a pin, clamp, bracket or other means is provided adjacent the ends of the flow tube so as to fix the resonant frequency of the sensing portion. Such structures are often attached directly onto the flow tube material. These attachment processes may also create residual stress within the tubing. Upon annealing and cryogenic cooling of the flow tube, including the joint between the attached elements and the tubing, the residual and internal stress at the joint are substantially removed.

Figure 3:
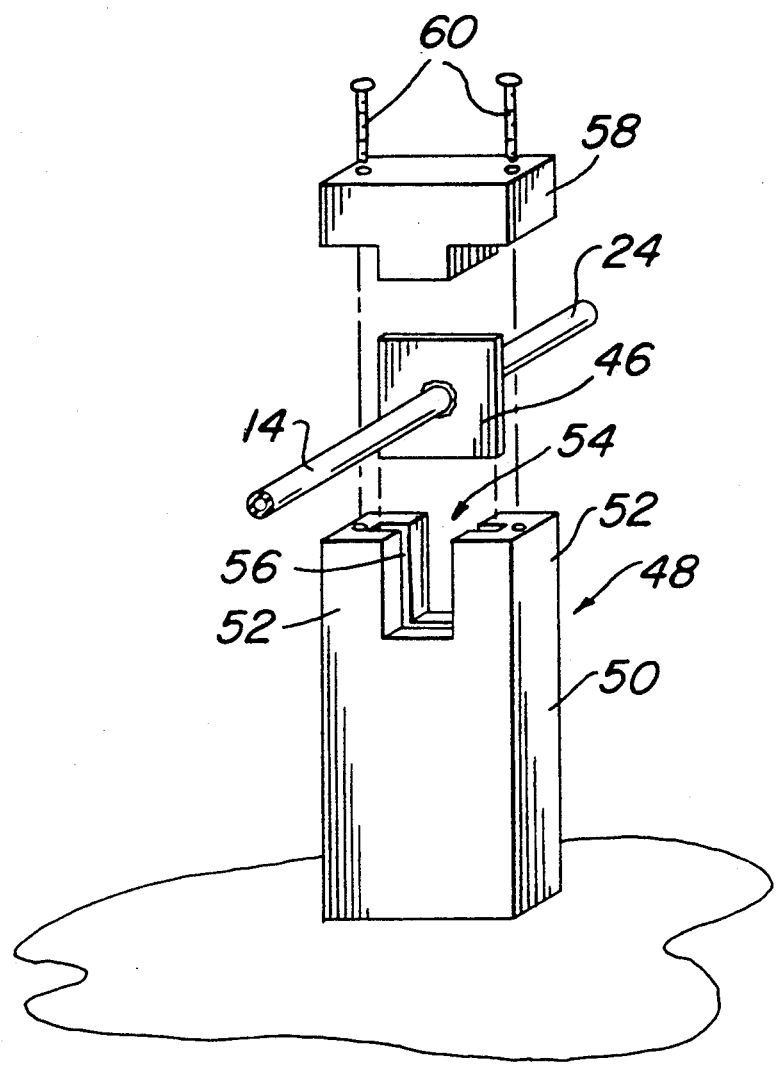
FIG. 3 shows a Coriolis mass flow meter structure for use along with the present invention.

FIG. 3 shows a fixing structure for use along with a flow tube treated by the method of the present invention. A fixing frame or flange 46 is attached directly onto the flow tube 14 at the desired position for defining the preferred resonant frequency of the sensing portion 24. The flange 46 may be attached to the outside of the tubing by a vacuum brazing, welding or similar process. A resonant pin 48 is used to fix flange 46 to define the sensing portion 24 of the flow tube 14. The pin 48 includes a base 50 having two upstanding projections 52 forming an opening 54 therebetween. The projections 52 include a slot 56 facing inwardly towards the opening 54 and aligned therewith so as to receive flange 46. A clamp 58 is attached to the top of the projections 52 by means of screws 60.

The brazing of flow meter elements onto the flow tube may be performed simultaneously with the annealing process. As shown in FIG. 1, the forming blocks 30 and 32 include slots 80 for receipt of the attached flanges 46. Prior to the annealing step, flange 46 is fixed to the tubing at the desired position and the brazing material applied to the joint. The slots 80 hold the flanges 46 in the desired position on the flow tube 14. Since the annealing process is preferably performed at around 2100° F., the brazing material is contemplated to be a pure copper or a boron and nickel combination. Other materials for brazing will have too low of a melting temperature. However, some of the brazing material will flow during the annealing/brazing process. Channels or openings (not shown) may be provided in the bending form 10 and clamping block 12 adjacent the slots 80 to permit the material to flow away from these fixtures. Thus, the brazing material, will attach the flanges 46, or other structures, to the flow tube 12 and not attach the flow tube to the treatment fixtures. It should be noted that, since the annealing/brazing step is preferably performed in a vacuum, the brazing material may flow in either direction from the joint. Thus, the channels may be required on both the bending form 10 and the clamping block 12. Other methods of directing the flow of the brazing material from the joint to prevent attachment to the fixtures may also be used.

Further attachment to the flow tube of structural elements of the flow meter is also contemplated. Sensors or portions thereof may be fixed to the flow tube. Also, the brace structure used along with the flow meter of copending application Ser. No. 404,919, filed Sept. 8, 1989 (referred to above), may be attached at the central position on the flow tube 14 along with the driver. This brace and portions of the driver may also be fixed to the flow tube in any convenient manner. Further, dual tube type Coriolis mass flow meters may be treated in the manner contemplated by the present invention. Such dual tube which are attached to the flow tube ends for dividing the inlet flow equally between the parallel tubes. Other flow meter structures may also be processed by the method of the present invention as will be apparent to those skilled in the art.

The present invention may be embodied in other specific forms without departing from the spirit or essential attributes thereof and, accordingly, reference should be made to the appended claims, rather than to the foregoing specification, as indicating the scope of the invention.

We claim:

1. A method of treating structures of a Coriolis mass flow meter, including a flow tube comprising the steps of: bending the flow tube of the Coriolis mass flow meter into a desired shape, fixing related flow meter elements onto the flow tube, annealing the bent flow tube and cryogenically cooling the bent and annealed flow tube, thereby relieving internal and residual stress within the flow tube material.

2. The method as claimed in claim 1 further comprising the step of supporting the bent flow tube in the desired shape during the annealing and cooling.

3. The method as claimed in claim 1 wherein the flow tube is bent by a cold working process.

4. The method as claimed in claim 1 wherein the annealing process includes raising the temperature of the flow tube to approximately 2100° F.

5. The method as claimed in claim 1 wherein at least a portion of the cryogenic cooling process id performed at approximately −320° F.

6. The method as claimed in claim 1 further comprising the step of fixing a frame structure onto the flow tube to define a sensing portion within the length of the flow tube.

7. The method as claimed in claim 1 wherein the fixing step includes a vacuum brazing process.

8. The method as claimed in claim 7 wherein the fixing step and the annealing step are performed simultaneously.

9. A method of treating structures of a Coriolis mass flow meter, including a flow tube comprising the steps of: forming the flow tube of the Coriolis mass flow meter into a desired shape, supporting the formed flow tube for subsequent processing, annealing the supported flow tube, cryogenically cooling the annealed and supported flow tube, returning the cooled flow tube to ambient temperature, and assembling the flow meter incorporating the formed, annealed, and cryogenically treated flow tube.

10. The method as claimed in claim 9 wherein the forming step includes bending the flow tube into the desired shape.

11. The method as claimed in claim 10 further comprising the step of attaching related flow meter elements to the flow tube substantially simultaneously the annealing step.

12. A method of treating structures of a Coriolis mass flow meter including flow tube, comprising the steps of:
bending the flow tube of the Coriolis mass flow meter into a desired shape,
fixing a frame structure onto the flow tube to define a sensing portion within the length of the flow tube,
annealing the bent flow tube, and
cryogenically cooling then bent and annealed flow tube,
thereby relieving internal and residual stress within the flow tube.

13. The method as claimed in claim 12 further comprising the step of supporting the bent flow tube in the desired shape during the annealing and cooling process.

14. The method as claimed in claim 13 wherein the fixing step includes a vacuum brazing process.

15. The method as claimed in claim 13 wherein the fixing step and the annealing step are performed simultaneously 16. The method as claimed in claim 12 wherein the flow tube is bent by a cold working process.

17. The method as claimed in claim 12 wherein the annealing process includes raising the temperature of the flow tube to approximately 2100° F.

18. The method as claimed in claim 12 wherein at least a portion of the cryogenic cooling process is performed at approximately −320° F.

* * * * *